July 24, 1956

R. A. ERSKINE 2,755,741

POWER TRANSMISSION

Filed May 3, 1954

*INVENTOR.*
ROBERT A. ERSKINE
BY
Ralph L. Tweedale
ATTORNEY

United States Patent Office 2,755,741
Patented July 24, 1956

2,755,741

POWER TRANSMISSION

Robert A. Erskine, Detroit, Mich., assignor to Vickers Incorporated, Detroit, Mich., a corporation of Michigan Application May 3, 1954, Serial No. 427,325

2 Claims. (Cl. 103—42)

This invention relates to power transmissions, and is particularly applicable to those of the type comprising two or more fluid pressure energy translating devices, one of which may function as a pump and another as a fluid motor.

The invention is more particularly concerned with a rotary fluid pump having a pressure relief valve mounted therein for relieving excessive pressure fluid from the discharge side of the pump to the inlet side in order that the discharge pressure will not exceed a predetermined maximum.

The mounting of a relief valve in a pump housing conserves space and weight by eliminating the need for a separate housing for the relief valve. The mounting of certain types of relief valves in pump housings, however, has presented a difficult problem because of the multiplicity of bores and complex passage and porting arrangement necessary for coaction of the relief valve with the discharge and inlet sides of the device. One such relief valve is that of the balanced type which has opposed operating surfaces adapted to be simultaneously connected to the high pressure side of the device. A pilot relief valve is utilized to control the main balanced type of relief valve in a manner to relieve the pressure on one of the operating surfaces thereof and thereby unbalance the resultant forces to cause actuation of the main relief valve to the open or relieving position. Relief valves of this type have proven to be very efficient as hydraulic system relief valves and for controlling the discharge pressure of the fluid pump.

It is therefore an object of this invention to provide an improved rotary fluid pump and pressure relief valve structure.

It is another object of this invention to provide a rotary fluid pump constructed for more conveniently and economically mounting therein a balanced type of pilot valve operated relief valve.

It is still another object of this invention to provide a rotary fluid pump having a pressure relief valve of the pilot valve operated type mounted completely therein which is simple and economical in design and construction, which is durable and which provides maximum efficiency at lower cost.

Further objects and advantages of the present invention will be apparent from the following description, reference being had to the accompanying drawing wherein a preferred form of the present invention is clearly shown.

Figure 1:
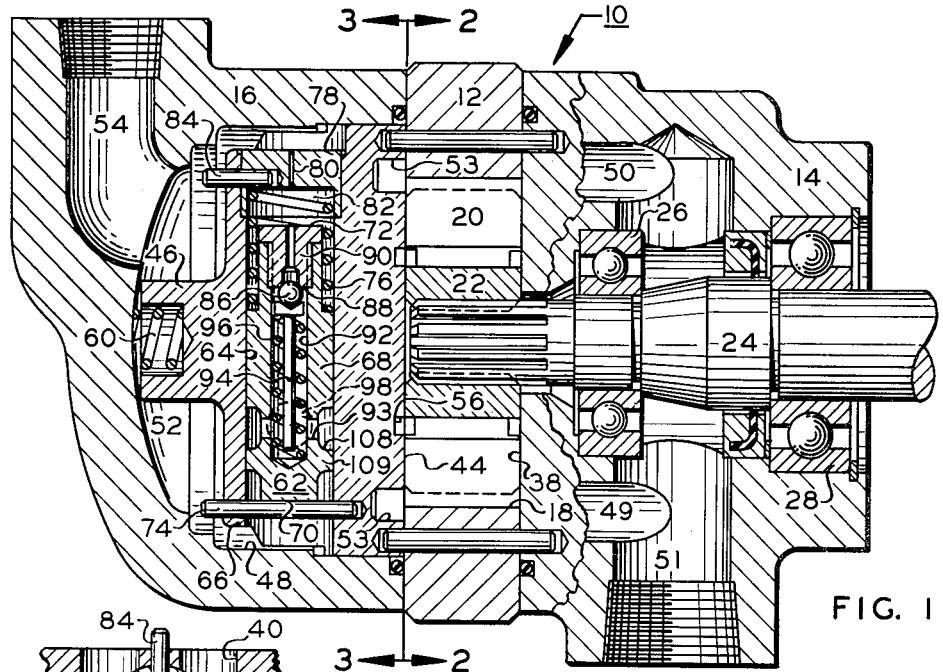
Figure 1 is a sectional view of a rotary fluid energy translating device embodying a preferred form of the present invention.
Figure 3:
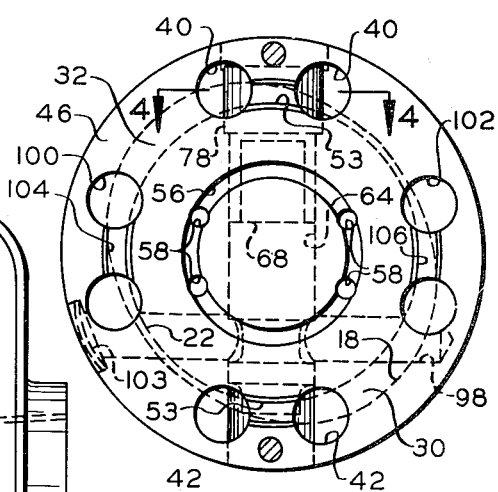
Figure 3 is a partial sectional view taken on line 3—3 of Figure 1.

Referring now to Figure 1, there is shown a rotary vane pump indicated generally by the numeral 10, the body of which is in three sections comprising a ring member 12 sandwiched between a main body portion 14 and an end cover 16. The inner periphery of the ring member 12 which is indicated by the numeral 18 is substantially elliptical in contour and forms a track for the outer edge of slidable vanes 20 carried by a rotor 22 mounted within the ring member 12. The rotor is driven by a shaft 24 rotatably supported in bearings 26 and 28 mounted in the body portion 14. With the rotor 22 mounted in the ring 12, two opposed working chambers 30 and 32 are formed each of which may be divided into a fluid inlet zone and a fluid outlet zone as shown more clearly in Figures 2 and 3.

Figure 2:
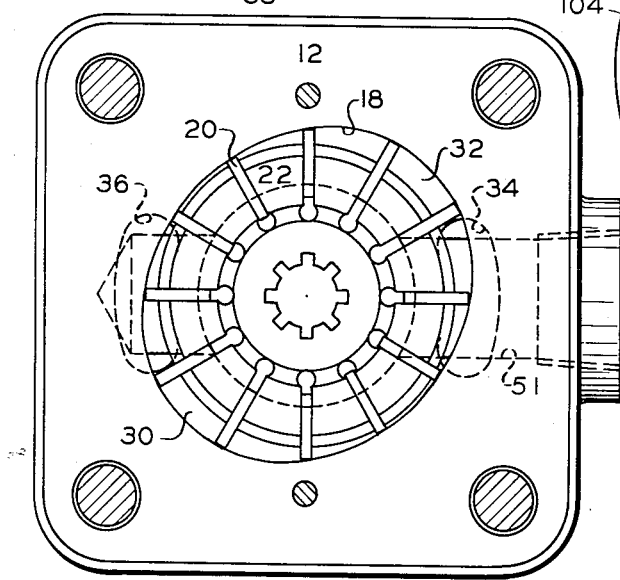
Figure 2 is a sectional view taken on line 2—2 of Figure 1.

The fluid inlet zones of the chambers 30 and 32 are those portions of the working chambers registering with diametrically opposed fluid inlet ports 34 and 36 opening to a left end face 38 of the main body section 14. The fluid outlet zones of the chambers 30 and 32 are those portions of said chambers registering with diametrically opposed fluid outlet ports 40 and 42 in the right end face 44 of a pressure plate 46 which is floatably mounted within a hollow portion 48 of the end cover 16. In Figure 2 the inlet ports 34 and 36 have been shown in dotted lines and in Figure 3 the rotor 22 and vane track 18 have been shown in dotted lines to show the positional relationship of the porting and the working chambers of the device.

The inlet ports 34 and 36 comprise terminus openings respectively of two branched passages 49 and 50 connected to a fluid inlet supply passage 51 in the body portion 14. Each of the outlet ports 40 and 42 comprise a pair of drilled holes which are connected to each other on the side of the pressure plate facing the rotor by a milled slot 53. The ports 40 and 42 extend completely through the pressure plate to open to a pressure chamber 52 formed in the hollow portion 48 of the end cover 16 when the pressure plate 46 is mounted therein. An outlet passage 54 leads directly from the pressure chamber for delivery of the pump displacement.

A circular pressure groove 56 is provided on the side of the pressure plate facing the rotor connected to which are a plurality of ports 58 adapted to connect the pressure chamber to the underside of the slots in which the vanes are mounted to maintain the outer edges of the vanes in contact with the vane track. The right end face of the plate is adapted to be maintained in contact against a portion of the immediately adjoining flat face of the ring 12 and in fluid sealing engagement against the rotor 22 by outlet pressure acting against the opposite face of the pressure plate in the pressure chamber. At starting and at extremely low pressures a spring 60 is adapted to provide the necessary contact force.

For the purpose of limiting the maximum operating pressure of the pump and relieving excessive pressure fluid back to the inlet side of the pump there is provided a pilot operated relief valve of the balanced type, indicated generally by the numeral 62, which is mounted completely within a vertical bore 64 extending completely through the pressure plate 46. The diameter of the pressure plate at its inner end is substantially the same as the diameter of the hollow portion 48 of the end cover 16 but is provided with a smaller diameter portion adjacent thereto indicated by the numeral 66 thereby exposing the opposite ends of the bore 64 to pressure existing in the pressure chamber 52.

Figure 4:
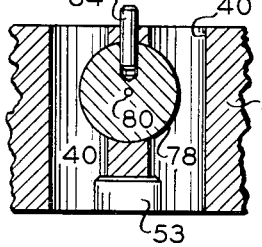
Figure 4 is a partial sectional view taken on line 4—4 of Figure 3.

The relief valve 62 comprises a main valve spool 68 having a bottom pressure effective surface indicated by the numeral 70 which is exposed to pressure in the lower end of the bore 64 and having an upper pressure effective surface indicated by the numeral 72 exposed to pressure at the upper end of the bore 64. The valve spool 68 is biased to the closed position shown against an abutment pin 74 by a spring 76. The upper end of the bore 64 is closed by a plug 78 except for a restriction 80 in the plug, also shown in Figure 4, which connects the pressure chamber to a control chamber 82 formed between the plug 78 and the upper pressure responsive surface 72 of the valve spool. A pin 84 may be utilized for fastening the plug 78 to the pressure plate in the upper end of the bore 64.

The relief valve 62 is operated to the open position by unbalancing the resultant forces on the opposed balanced surfaces 70 and 72 of the valve spool 68. For this purpose there is provided a pilot valve 86 which is normally maintained on a seat 88 formed in a seat insert member 90 which is threaded into a bore 92 of the valve spool 68. The pilot valve 86 is maintained on the seat by a retainer member 94 biased by a spring 96 the loading of which determines the maximum displacement pressure of the pump 10. When the pilot valve 86 is operated from the seat 88, the control chamber 82 is vented to the inlet side of the pump by means of the bore 92, cross drilled holes 93 in the spool 68, and a cross passage 98 leading from the valve spool bore 64 to relief ports 100 and 102 on the rotor side of the pressure plate 46 which register with the fluid inlet zones of the working chambers. The cross passage 98 may be suitably closed at the periphery of the cheek plate by a plug 103. The relief ports 100 and 102 each comprise a set of two partially drilled holes respectively connected by slots 104 and 106. The main valve spool 68 is provided with a groove 108 adapted to cooperate with the cross passage 98. When the main valve spool shifts upwardly a valve spool land 109 opens the pressure chamber through the lower end of bore 64 to the cross passage 98 to connect the outlet side of the pump to the inlet side.

In operation the fluid inlet supply zones of the pump will be supplied with fluid through the inlet passage 50 which leads to the inlet supply ports 34 and 36. As the rotor 22 turns, fluid will be discharged from the fluid outlet zones through the fluid outlet ports 40 and 42 of the pressure plate 46 into the pressure chamber 52 and thence to the outlet passage 54. During this operation the pressure existent in the pressure chamber is transmitted to opposite ends of the vertical valve bore 64 where it acts against the lower exposed surface 70 of valve spool 68 and simultaneously on the upper surface 72 of the same valve spool by means of the restriction 80 and control chamber 82. As the same pressure is acting on balanced end areas of the valve spool the valve remains in the closed position. The same pressure is also transmitted to the pilot valve 86 and when reaching a value equal to the loading of spring 96 the pilot valve 86 is shifted from the seat 88. The control chamber 82 is then vented through the open seat 88, valve bore 92, drilled holes 93 and cross passage 98 to the relief ports 100 and 102 in the pressure plate 46 which register with and lead to the fluid inlet zone of the pump. With the control chamber 82 vented to the inlet side of the pump a differential in pressure is created at opposite ends of the bore 64 on the lower operating surface of the valve spool and in the control chamber on the upper valve surface 72 thus completely unbalancing the resultant forces thereon. The valve spool is shifted upwardly together with land 109 and the pressure chamber is thereby opened to the cross passage 98 and relief ports 100 and 102. The delivery of the pump is then by-passed to the fluid inlet zones at the pressure at which the pilot relief valve opens by means of the main valve bore 64, cross passage 98 and the pressure plate relief ports 100 and 102. When the pressure decreases below the loading of the pilot valve spring 96, the pilot valve is shifted to the closed position, the main valve spring 76 returns the valve spool 68 to the position shown and the land 109 blocks the pressure chamber and pressure delivery ports from communication with the cross passage 98 and relief ports 100 and 102 of the pressure plate.

There is therefore provided a rotary fluid pump having mounted completely therein a pilot valve operated, balanced type of pressure relief valve. The pump housing is provided with a chamber connected to the discharge side of the pump and a bore is conveniently located in the pump housing, or in a pressure plate, in a manner so that the opposite ends of the bore are exposed to pressure in the chamber and thus the delivery side of the pump. A pressure relief valve of the balanced type may conveniently be placed in this bore with the opposed balanced operating surfaces thereof exposed to the pressure in the chamber. A passage may be economically constructed connecting the bore to the inlet side of the pump. In the device illustrated, the relief valve bore is located in a pressure plate adjacent to the rotor and which is provided with a cross passage leading to relief ports in the pressure plate registering with the fluid inlet zones of the pump. A further saving of space, weight and cost of a separate housing may be provided by utilizing the main relief valve as a housing for the pilot relief valve. Intricate passage construction is avoided by also exposing the pilot relief valve to the pressure at one end of the relief valve bore and causing the pilot valve to vent the main relief valve at a predetermined pressure through the latter valve itself to the inlet side of the pump. The construction thus avoids a multiplicity of intricate bores and passages, eliminates the need for separate housings for two valves, and permits utilization of an efficient pressure relief valve of the balanced, pilot valve operated type.

While the form of embodiment of the invention as herein disclosed constitutes a preferred form, it is to be understood that other forms might be adopted, all coming within the scope of the claims which follow.

What is claimed is as follows:

1. In a rotary fluid pump comprising a stator and a rotor forming a fluid inlet zone and a fluid outlet zone and having a pressure chamber at one side of the rotor within which is a cheek plate, one side of which is maintained in fluid sealing engagement with the rotor, said outlet zone being connected to the chamber through porting in the cheek plate, the combination of a valve mounting bore in the cheek plate the opposite ends of which open to spaced points in the pressure chamber, a main pressure relief valve mounted in the bore having opposed, substantially balanced, pressure operating surfaces exposed to pressure at opposite ends of the bore, a pressure relief passage in the cheek plate connecting the bore between the operating surfaces of the valve to the fluid inlet zone, said relief valve being biased to a position normally closing the relief passage, and a pilot relief valve exposed to pressure in the chamber, said pilot relief valve being responsive at a predetermined pressure in the pressure chamber to connect one end of the bore to the fluid inlet zone and causing operation of the main relief valve to connect the fluid inlet and outlet zones to each other.

2. In a rotary fluid energy translating device comprising a housing having a rotor mounted therein to form fluid inlet and fluid delivery zones, said rotor having a plurality of slidable vanes between which the fluid is carried from the inlet to the delivery zones, the combination of a chamber in the housing, a cheek plate mounted in the chamber maintained in fluid sealing engagement against the rotor immediately adjoining the fluid zones and having delivery ports connecting the fluid delivery zones to the chamber, a balanced type pressure relief valve mounted in the cheek plate and having opposed, substantially balanced, operating surfaces exposed to pressure at spaced points in the chamber, a relief passage in the cheek plate leading from the pressure relief valve to the fluid inlet zones and normally closed by the relief valve, and a pilot relief valve exposed to pressure in the chamber for unbalancing the forces on the operating surfaces of the balanced relief valve at a maximum predetermined pressure, the balanced relief valve being operable to open the relief passage and thereby connect the fluid outlet zones to the fluid inlet zones.

References Cited in the file of this patent

UNITED STATES PATENTS

| | | |
|---|---|---|
| 2,437,791 | Roth | Mar. 16, 1948 |
| 2,619,112 | Renick | Nov. 25, 1952 |
| 2,667,125 | Foss | Jan. 26, 1954 |

OTHER REFERENCES

Serial No. 404,526, Kleeberger (A. P. C.), published May 11, 1943.